United States Patent
Vogel et al.

(10) Patent No.: US 8,322,880 B2
(45) Date of Patent: Dec. 4, 2012

(54) ILLUMINATION DEVICE FOR AN AIRCRAFT

(75) Inventors: Carsten Vogel, Hamburg (DE); Detlef Heym, Achim (DE)

(73) Assignee: Airbus Operations GmbH (DE)

( * ) Notice: Subject to any disclaimer, the term of this patent is extended or adjusted under 35 U.S.C. 154(b) by 655 days.

(21) Appl. No.: 12/522,195

(22) PCT Filed: Jan. 4, 2008

(86) PCT No.: PCT/EP2008/000036
§ 371 (c)(1),
(2), (4) Date: Jul. 6, 2009

(87) PCT Pub. No.: WO2008/083935
PCT Pub. Date: Jul. 17, 2008

(65) Prior Publication Data
US 2010/0091506 A1  Apr. 15, 2010

Related U.S. Application Data

(60) Provisional application No. 60/879,960, filed on Jan. 11, 2007.

(30) Foreign Application Priority Data

Jan. 11, 2007 (DE) .......................... 10 2007 001 702

(51) Int. Cl.
*F21V 7/05* (2006.01)
(52) U.S. Cl. .......................... 362/246; 262/307; 262/330
(58) Field of Classification Search .................. 362/242, 362/243, 244, 245, 246, 327, 330, 333, 334, 362/335, 307, 470, 471
See application file for complete search history.

(56) References Cited

U.S. PATENT DOCUMENTS

| 2,258,353 | A | | 10/1941 | Doane |
|---|---|---|---|---|
| 4,105,293 | A | * | 8/1978 | Aizenberg et al. ............ 359/243 |
| 5,129,597 | A | | 7/1992 | Manthey et al. |
| 5,226,711 | A | | 7/1993 | Matsuno et al. |
| 6,161,939 | A | * | 12/2000 | Bansbach ...................... 362/223 |
| 7,481,562 | B2 | * | 1/2009 | Chua et al. .................... 362/339 |
| 2003/0048641 | A1 | | 3/2003 | Alexanderson et al. |
| 2006/0226795 | A1 | | 10/2006 | Walter et al. |
| 2006/0274546 | A1 | | 12/2006 | Yamamura |
| 2006/0285356 | A1 | * | 12/2006 | Tseng ............................ 362/246 |
| 2008/0037284 | A1 | * | 2/2008 | Rudisill ........................ 362/246 |

FOREIGN PATENT DOCUMENTS

| DE | 3904375 | 8/1990 |
|---|---|---|
| DE | 19852593 | 5/2000 |
| DE | 10302499 | 8/2004 |
| EP | 0408709 | 1/1991 |
| EP | 0656281 | 6/1995 |

(Continued)

*Primary Examiner* — Y My Quach Lee
(74) *Attorney, Agent, or Firm* — Lerner, David, Littenberg, Krumholz & Mentlik, LLP

(57) ABSTRACT

An illumination device for an aircraft, comprising a combination of two-dimensional background illumination with a reflection of incident light on a face pointing towards the viewer in order to achieve a particular depth effect, as a result of which the illumination body appears to the viewer in greater visual depth than is actually the case. This is, in particular, of importance in aircraft, in which not only is the available space small, but also the weight aspect that is inevitably associated with large bodies plays an important role.

22 Claims, 4 Drawing Sheets

FOREIGN PATENT DOCUMENTS

| | | |
|---|---|---|
| EP | 1522459 | 4/2005 |
| FR | 663429 | 8/1929 |
| JP | 2002075022 | 3/2002 |
| WO | 2005007450 | 1/2005 |

\* cited by examiner

ILLUMINATION DEVICE FOR AN AIRCRAFT

This application claims the benefit of the filing date of U.S. Provisional Patent Application No. 60/879,960 filed Jan. 11, 2007 and of German Patent Application No. 10 2007 001 702.4 filed Jan. 11, 2007, the disclosures of which are hereby incorporated herein by reference.

FIELD OF THE INVENTION

The present invention relates to an illumination device for an aircraft, and in particular to an illumination device for an aircraft, which illumination device has a shallow installation depth while nevertheless creating a deep spatial effect.

BACKGROUND TO THE INVENTION

As a rule, the space requirement in aeroplanes and in aircraft in general is relatively limited. Due to the fact that passengers, in particular in the case of long-haul flights, are in an aircraft for a relatively long time and in doing so have relatively little space available results in endeavours not only to use the existing small space as efficiently as possible, but also to achieve the largest possible spatial effect from the small space available.

A particular region of space management relates to the design of ceilings in common areas in aircraft, i.e. areas that are visited by several passengers during the flight or during entering and leaving the aircraft. Common areas are, in particular, entrance regions, ceilings, sanitary installations etc. As a rule, these regions are predominantly used with passengers in an upright position so that the clear space between a passenger's head and the ceiling is relatively small when compared to the situation, for example, in a seating area in which the clear space between a seated passenger and the ceiling is often significantly larger.

This results in the need, in the region of common areas, to provide devices and in particular illumination devices that provide to passengers the impression of larger size and width than the size and width that is actually present.

SUMMARY OF THE INVENTION

It can be understood to be an object of the present invention to provide an illumination device which gives a viewer the impression of greater spatial dimensions than those that are actually present.

This object is met by the subject of the independent claims, wherein advantageous embodiments are incorporated in the dependent claims.

According to an exemplary embodiment, an illumination device for an aircraft comprises a body with at least a first surface and a second surface, which differs from the first surface, a first light source, which is arranged such that at least part of the light that can be given off by the first light source impinges on the first surface as incident light, wherein the second surface of the body is arranged such that at least part of the light that impinges on the second surface of the body can radiate into the body and can be given off via the first surface as diffused light, wherein the first surface is designed such that at least part of the light that impinges as incident light on the first surface from the first light source can be reflected by the first surface.

The term "reflect" denotes that the reflected light is reflected at an angle of reflection, which angle corresponds to the angle of incidence, in relation to a tangent through the reflection point.

In this arrangement the light that is given off in a diffused manner represents a type of background illumination of the illumination body. By combining a plane background illumination, by diffusing transmitted light that is inward radiated via the second surface and that is given off in a diffused manner via the first surface, with the reflection of incident light on the first surface, depending on the selected illumination colours and brightness gradients, a particular depth effect can be achieved, as a result of which effect the illumination body appears to the viewer in greater visual depth than is actually the case. This is in particular important in regions in which visually a large spatial expanse is to be achieved but the available space is not sufficient to install bodies with such actual dimensions. This is, in particular, the case in aircraft, in which not only is the available space small, but also the weight aspect that is inevitably associated with actual large bodies plays an important role.

According to an exemplary embodiment, the illumination device comprises a second illumination source that is arranged such that at least part of a light that can be given off by the second light source impinges on the second surface of the body as incident light such that the body gives off the light via the first surface as diffused light.

In this manner, generating incident light can be separated from generating transmitted light. The transmitted light can, for example, be provided in the form of fluorescent tubes or LED matrix arrangements, while the incident light, for example laterally, can be provided in the form of a light ribbon. Separation of the two light sources makes it possible to achieve increased variation options.

According to an exemplary embodiment, the second light source is arranged so as to face the second surface.

According to an exemplary embodiment, the volume of the body is at least partly light diffusing.

By providing a body with a light-diffusing volume, particularly even transmitted light illumination of a surface can be achieved. The spacing of the light source for the background illumination can be selected to be smaller because a light-diffusing volume makes possible better diffusion of the light when compared to that of a surface.

According to an exemplary embodiment, the second surface is arranged at an essentially constant distance from the first surface. Consequently, the main surfaces that delimit the body are essentially parallel; in the case of non-curved main surfaces they are even plane-parallel.

According to an exemplary embodiment, as an alternative or in addition, the second area, too, can be light diffusing. Under given circumstances manufacturing a surface that diffuses in a defined manner is easier than manufacturing a volume that diffuses in a defined manner, in particular when the distance between the main surfaces of the body is not constant, i.e. when the surfaces are not arranged at the same distance from each other.

According to an exemplary embodiment, the first surface is essentially concave relative to the first light source.

The above creates a certain spatial effect that is further reinforced by corresponding illumination. As a rule, the viewer is in a position in which s/he is situated on the face of the illumination device, which face comprises the first surface, in other words the viewer looks onto the surface that is illuminated by the first light source and that is reflective. The viewer or the passenger in an aircraft perceives an existing curvature that is concave from his/her point of view, wherein, however, the illumination suggests greater visual depth of the concave surface than is actually present.

According to an exemplary embodiment, the curvature of the first surface essentially increases from a predetermined point on the first surface as the distance from this point increases.

An increase in the curvature, for example from the centre of a flat dome towards the outside regions, creates an effect to a viewer who is situated underneath the dome, which effect corresponds to that of a hemisphere, although the viewer is merely situated underneath a flattened dome with a considerably smaller installation depth. The visual effect of the hemisphere is in particular created in that, in the same way as in a flattened dome that comprises increased curvature in the border regions, in the case of a hemisphere the highest point is flat, i.e. essentially parallel to the floor on which the viewer is situated, and the border regions extend vertically in relation to the floor.

According to an exemplary embodiment, the position of the second light source and a measure for the light diffusibility are matched to each other such that illumination by the second light source on the first surface appears essentially even.

In the case of a more strongly diffusing arrangement, caused either by a diffusing surface or a diffusing volume, background illumination, i.e. the transmitted light, can be brought closer to the body without the position of the light source being perceivable by the viewer. By an optimal selection of the distance between the light source and the body as a function of the diffusibility of the body, the installation depth can be optimised and at the same time it is possible to achieve an illumination that is essentially plane and homogeneous or even.

According to an exemplary embodiment, the second light source comprises a multitude of subordinate light sources, wherein the multitude of subordinate light sources can be selected in such a way depending on their positions that a brightness gradient appears on the first surface, which brightness gradient is perceived as being essentially continuous.

By means of several light sources it is possible on the one hand to achieve more even background illumination at a little installation depth, and on the other hand to implement a brightness gradient that contributes to a reinforcement of the visual depth effect.

According to an exemplary embodiment, the second light source is a fluorescent tube or a multitude of fluorescent tubes, or, as an alternative, a LED matrix.

According to an exemplary embodiment, the first light source is designed such that it can change colour. According to an exemplary embodiment, the second light source, too, can be designed so as to change colour locally and over time.

The ability to change colour of the background illumination, in particular in the case of a colour change depending on the position, can reinforce the spatial depth effect. Furthermore, depending on the time of day or on the travel destination or the location, a different mood can be generated by a corresponding colour selection.

According to an exemplary embodiment, the body is a thermoplastically deformed plastic panel. The plastic can, for example, be a polycarbonate (PC), an acrylic or Plexiglas material or any other suitable material that meets the requirements of aircraft engineering, in particular the fire protection regulations.

A plastic panel is not only easy to process, but from the point of view of weight is also more favourable than glass in the context of installation in an aircraft. Furthermore, from the point of view of fire protection, at least some types of plastic are suitable for installation in aircraft. Opaque areas are comparatively easy to implement in order to generate the light-diffusing effect. Modern plastics are also relatively resistant to breakage and are long lasting as far as their visual characteristics are concerned.

According to an exemplary embodiment, a diffuser is provided between the first light source and the first surface.

A diffuser between the first light source and the first surface diffuses the light given off by the first light source such that a viewer does not perceive the components of said first light source, which components are reflected on the first surface, as emanating from a point-shaped light source.

According to an exemplary embodiment, the body is a flat curved dome with an essentially round base surface, and the first light source is arranged in a ribbon shape on the inside in front of the margin of the dome and comprises a multitude of light emitting diodes.

According to an exemplary embodiment, a cover is provided which encloses the margin of the dome such that neither the margin of the dome nor the first light source are directly visible.

According to an exemplary embodiment, the first light source gives off an essentially blue light at a wavelength ranging from 460 nm to 490 nm, preferably of 470 nm. Of course, other colours and colour combinations are also possible, depending on customer requirements.

According to an exemplary embodiment, an aircraft, a ship or a vehicle with an illumination device described above is provided.

The individual and single features can also be combined among themselves.

The descriptions relating to the device analogously also relate to a corresponding method, a corresponding program element and a computer-readable storage medium.

These and other aspects are explained with reference to the following drawings.

Below, exemplary embodiments of the invention are described in detail with reference to the drawings.

DETAILED DESCRIPTION OF EXEMPLARY EMBODIMENTS

Figure 1:
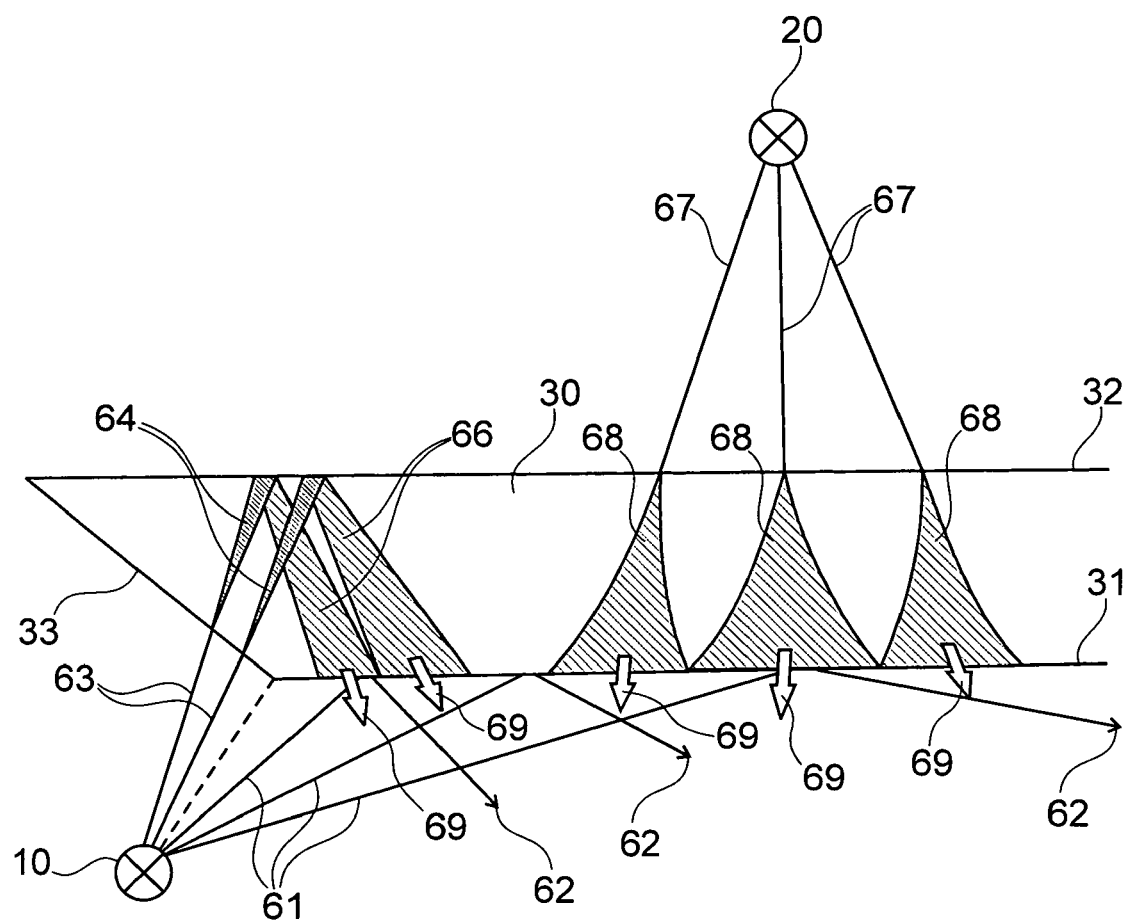
FIG. 1 shows an arrangement that shows two exemplary embodiments of the invention.

FIG. 1 shows an illumination device for an aircraft, with a body 30 which in the embodiment shown in FIG. 1 is in the form of a plate. However, the body can also be in any other suitable form, for example a free form. The body comprises a first surface 31 and a second surface 32, 33. A first light source 10 is provided, which gives off light such that it impinges on the first surface 31 at least in part.

Furthermore, the second surface 32, 33 of the body 30 is arranged such that at least part of the light that impinges on the second surface of the body can be radiated into the body and can be given off as diffused light by way of the first surface 31.

The light that enters by way of the second surface 32, 33 as incident light can emanate either from the first light source 10 by being input via the surface 33, or it can emanate from a second light source 20 by being input via the surface 32. In the first case the first light source 10 can be arranged such that part of the light impinges on the first surface 31 as incident light, while another part impinges on the second surface 33 as incident light. The light 61 that impinges on the first surface 31 as incident light is reflected by the first surface 31. The first surface 31 is designed such that at least part of the light 61 that impinges on the first surface 31 as incident light from the first light source 10 can be reflected by the first surface so that reflected light 62 is reflected by the first surface 31. The light fraction 63, which impinges on the second surface 33 as incident light, which second surface 33 in the embodiment shown is an edge or front face area of the body 30, is given off by diffuse reflection 66 on the face of the surface 32, which face points towards the body 30, via the first surface 31 in a diffused manner in the form of diffused light 69. In this arrangement the volume of the body 30 can have a diffusing effect, and/or a layer or surface of the body, through which layer or surface the light passes, can have a diffusing effect. The light fraction 63 that enters as incident light via the second surface 33 is diffused such that the light beams 63 undergo refraction when they enter the body 30, and are expanded 64 in the body 30, and if applicable are reflected by a further surface 32 and emanate as a diffused light beam 66 from the body 30 as diffused light 69.

Instead of the light fraction 63 that enters the body 30 from the first light source 10 via a second surface 33, it is also possible to provide a second light source 20 whose light 67 impinges on the second surface 32 as incident light, which second surface 32 in the embodiment shown is arranged parallel in relation to the first surface, and whose light 67, through a diffusing layer or a diffusing volume of the body 30, propagates in the body 30 as diffused light 68, and, as shown in the present case, exits as diffused light 69 through the surface 31. Light of the second light source 20 can of course also be radiated in by way of the surface 33, which in the embodiment shown is the front face, by way of lateral input.

The effect generated in this arrangement consists of interaction between reflected light, which emanates, for example, from the first light source 10 and is reflected 62 by the first surface 31 of the body 30, with background illumination, for example from the second light source 20. Concurrent background illumination is produced by diffused illumination, or by illumination with diffused light, which provides the body with an inherent lighting effect. Thus the body appears as a diffusely lighting body 30, wherein the diffuse illumination is a result of the further light fraction 63 of the first light source 10. FIG. 1 shows the first surface 31 and the surface 32 essentially spaced apart from each other at a constant distance so that the body is a plate or a panel. Furthermore, the body can also comprise surfaces that are not parallel, depending on the illumination state that is to be achieved. In this arrangement the surface 31 can be concave in relation to the first light source 10 so that a design in the shape of a dome is achieved.

Figure 2:
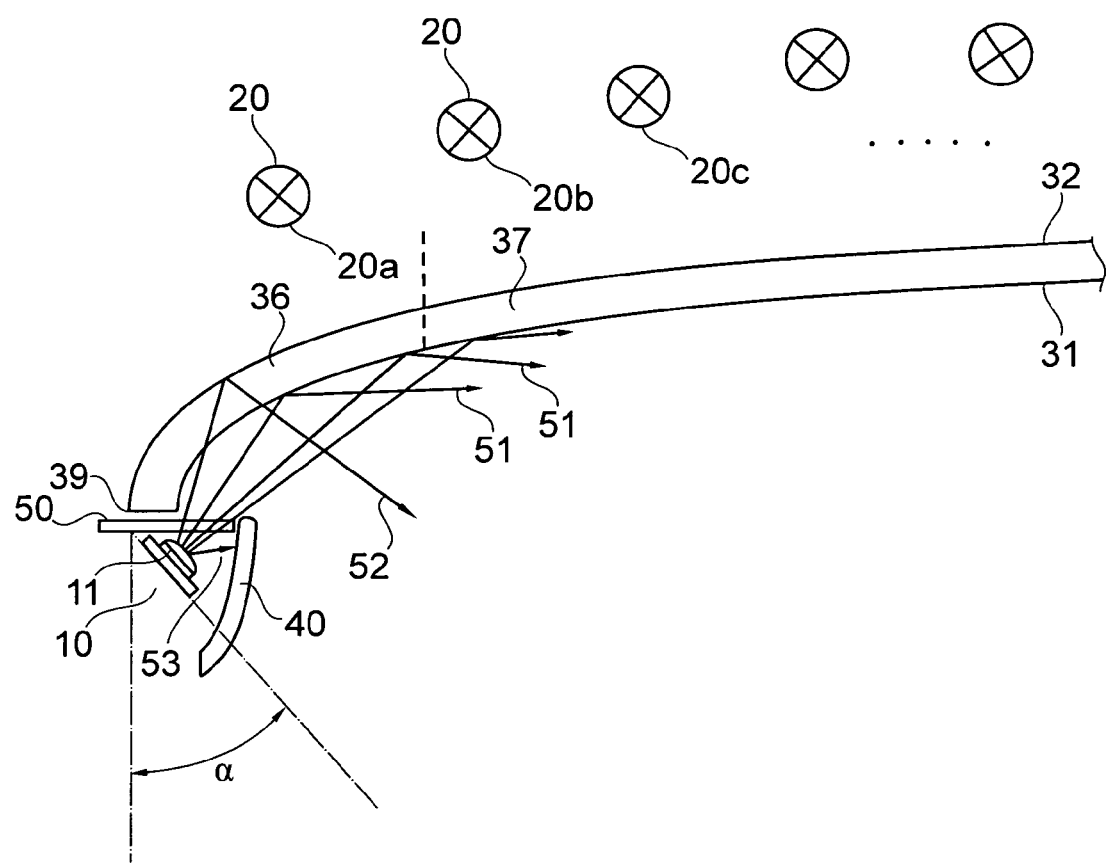
FIG. 2 shows an arrangement of a further exemplary embodiment of the invention.

FIG. 2 shows an arrangement in which the body 30 is in the shape of a dome, i.e. the first surface 31 is concave in relation to the first light source 10. In the embodiment shown in FIG. 2 the first light source is at the border of the dome and illuminates the dome, or more precisely the first surface 31 of the dome-shaped body 30. In this arrangement the surface 31 is reflective so that the light given off by the first light source 10 is essentially reflected by the surface 31 and is given off as reflected light 51. In this arrangement the first light source can be provided in the form of light emitting diodes 11 or in the form of a LED ribbon. In this arrangement the LED ribbon can comprise LEDs of different colours so that depending on requirements any desired secondary colours can be produced. Furthermore, a diffuser 50 can be provided between the first light source 10 and the first surface 31 in order to first diffuse the light given off by the first light source so that the diffuser 50 prevents the LEDs 11, for example, from being reflected by the surface 31.

Furthermore, a cover 40 can be provided, which covers both the first light source 10 and the edge or the margin 39 of the dome such that neither the margin 39 of the dome nor the first light source 10 is directly visible. This prevents a situation in which the light given off by the light source 10 is directly perceived by the viewer; instead, the cover 40 intercepts certain light fractions 53 in this respect, which light fractions might lead to the viewer being exposed to bright light.

However, light given off by the first light source 10 can also enter the body 30 such that said light visually colours the body and in this respect the light is given off 52, so as to be diffused or coloured, by way of the first surface 31. Regions of the body, which regions are situated 36 nearer the first light source 10 thus become regions in which the light is composed as a mixture of incident light and transmitted light. A second light source 20 can be provided to generate background illumination (diffused light) behind the body 30 so that the second light source 20 faces the surface 32. In this arrangement the surface 32 can be the second surface, by way of which light enters the body 30, which light is given off as diffused light via the first surface 31. In this arrangement the second light source 20 can comprise a multitude of individual light sources 20a, 20b, 20c, which depending on their positions can be individually controlled as far as brightness and light colour are concerned in order to achieve a colour or brightness gradient. In this arrangement the light sources 20a, 20b, 20c can be arranged such that depending on their distance from the surface 32 of the body 30 and depending on the diffusion behaviour of the body 30 or of a layer in the body 30, the background illumination appears even to the viewer, without individual light sources of the multitude of light sources 20a, 20b, 20c being perceptible to the viewer. Homogeneity of the illuminating surface 31 can be achieved both by changing the position of the individual lamps or subordinate light sources 20a, 20b, 20c, i.e. by mechanically changing the distance from the surface 32, and by electrical control of the individual lamps or subordinate light sources 20a, 20b, 20c, i.e. by dimming, for example by way of corresponding software control. In this arrangement the second light source can be a fluorescent tube or any other illumination means that meets the requirements of background illumination, for example a LED matrix. The first light source 10 can be arranged such that it is inclined at an angle a so as in this way to set the direction of radiation of the first light source 10.

Figure 3:
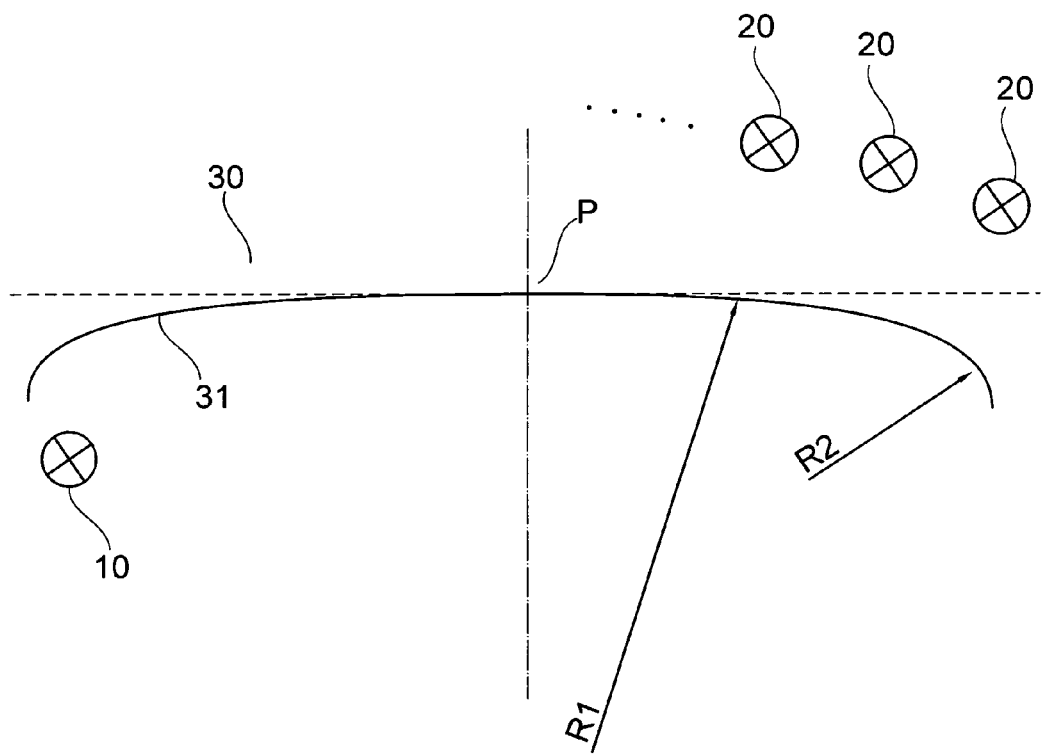
FIG. 3 shows an arrangement according to an exemplary embodiment of the invention in relation to various curvatures.

FIG. 3 shows a shape of the body 30 such that the first surface 31 has a curvature such that the curvature of the first surface 31 from a predetermined point P on the first surface 31 essentially increases as the distance from this point increases. In other words it can be provided for the dome-shaped surface 31, for example with an essentially circular shape of the body 30 or of the surface 31, at the centre to comprise a region with relatively little curvature R1, wherein the curvature increases in the border regions, i.e. the radius R2 decreases. In this way a flat dome is provided, which gives the viewer the impression of a certain spatial expanse.

By a corresponding selection of the background illumination, for example with a second light source 20, a diffuse background illumination is created as a result of the diffused light, wherein the light given off by the first light source 10 in the direction of the first surface 21 is reflected due to the reflective design of the first surface 31. In this way a viewer experiences a visual effect that magnifies the visually perceived curvature of the flat-drawn dome. In other words, as a result of corresponding illumination, for example with the first light source 10 and the second light source 20, the viewer perceives a dome that subjectively perceived has a significantly greater curvature than the curvature that is physically actually present. In this way it is possible, for example for use in an aircraft, to create a large spatial effect although only little installation space for an illumination element is present. This visual effect is important in particular in common areas in an aircraft, for example in the entrance region, because passengers no longer perceive the aircraft, in particular the regions in which they are in a standing or walking position, as being as spatially confined as it is in reality. In this way anxiety states such as claustrophobia or the like in aircraft can be prevented and passengers' well-being on board can be enhanced.

The body 30 can, for example, comprise a thermoplastically deformed plastic panel that can comprise surfaces, layers or volume regions that are able to diffuse light so that in interaction, for example with the second light source 20, two-dimensional background illumination can be achieved. Illumination with essentially white homogeneous background illumination (for example from the second light source 20) and with border illumination with essentially blue light at a wavelength of approximately 470 nanometres (for example from the first light source 10) has been shown to be particularly advantageous. In this wavelength spectrum it is possible to create a particular visual depth effect for the benefit of the viewer.

Figure 4:
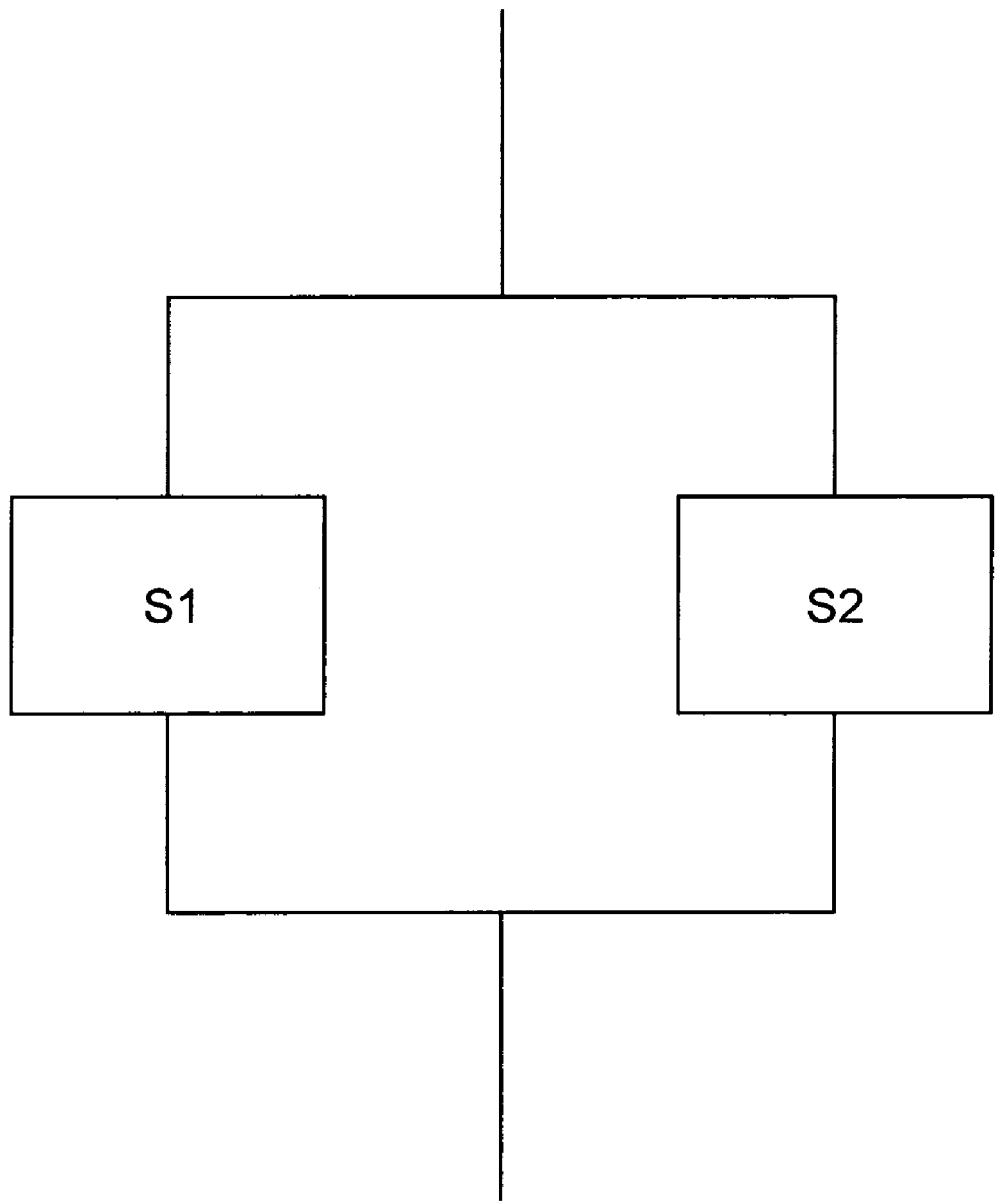
FIG. 4 shows a diagrammatic flow chart of a method according to an exemplary embodiment of the invention.

FIG. 4 shows a diagrammatic flow chart of a method for illuminating a body comprising illumination Si of a first surface 31 of the body 30 by a first light source 10, and illumination S2 of a second surface 32, 33 of the body 30, which second surface differs from the first surface in that the body 30 gives off light radiated in by way of the second surface 32, 33 in a diffused manner via the first surface 31, wherein the first surface 31 reflects 62 at least part of the light 61 radiated in by the first light source 10. Such a method can, for example, be carried out using a control unit that can be implemented either by means of hardware or software.

The terms "comprise", "comprising" etc. do not exclude the presence of other elements. The terms "a" or "one" do not exclude a plural number.

Reference characters in the claims are provided for better legibility and are not intended to limit the protective scope of the claims in any way.

The invention claimed is:

1. An illumination device for an aircraft, comprising:
   a body having at least a first surface and a second surface; and
   a first light source,
   wherein the first light source is arranged such that at least part of a light given off by the first light source impinges on the first surface as incident light;
   wherein the second surface differs from the first surface;
   wherein the second surface is arranged such that at least part of the light that impinges on the second surface radiates into the body and is given off through the first surface as diffused light; and
   wherein the first surface is configured such that at least part of the light that impinges as incident light on the first surface from the first light source is externally reflected by the first surface.

2. The illumination device for of claim 1, further comprising a second light source that is arranged such that at least part of a light given off by the second light source impinges on the second surface of the body as incident light such that the body gives off the light through the first surface as diffused light.

3. The illumination device for of claim 2, wherein the second light source is arranged so as to face the second surface.

4. The illumination device of claim 1, wherein the volume of the body is at least partly light diffusing.

5. The illumination device of claim 1, wherein the second surface is arranged at an essentially constant distance from the first surface, and wherein the second surface is light diffusing.

6. The illumination device of claim 1, wherein the first surface is essentially concave relative to the first light source.

7. The illumination device of claim 6, wherein the first surface defines a curvature, and wherein the curvature of the first surface essentially increases from a predetermined point on the first surface as the distance from this point increases.

8. The illumination device of claim 2, wherein the second light source defines a position that is a function of light diffusibility through the body such that illumination by the second light source on the first surface appears even.

9. The illumination device of claim 2, wherein the second light source comprises a multitude of subordinate light sources, and wherein the multitude of subordinate light sources are selected in such a way depending on their positions that a brightness gradient appears on the first surface such that brightness gradient is perceived as being essentially continuous.

10. The illumination device of claim 2, wherein the second light source is one or more fluorescent tubes.

11. The illumination device of claim 1, wherein the first light source is configured to change colour.

12. The illumination device of claim 1, wherein the body is formed from a thermoplastically deformed plastic plate.

13. The illumination device of claim 1 further comprising a diffuser, wherein the diffuser is positioned between the first light source and the first surface.

14. The illumination device of claim 1, wherein the body defines a flat curved dome having an essentially round base surface, wherein the dome includes an inside and a margin, and wherein the first light source is arranged in a ribbon shape on the inside in front of the margin of the dome and comprises one or more light emitting diodes.

15. The illumination device of claim 14, further comprising a cover enclosing the margin of the dome such that neither the margin of the dome nor the first light source is directly visible.

16. The illumination device of claim 1, wherein the first light source is configured to emit an essentially blue light having a wavelength that is approximately 470 nm.

17. A method for illuminating a body, comprising:
    providing a light source;
    providing a body having a first surface and a second surface;
    transmitting light from the light source toward the first surface of the body; and
    transmitting light from the light source toward the second surface of the body,
    wherein the light directed toward the second surface is diffused through the body and re-emitted through the first surface; and
    wherein the light directed toward the first surface is externally reflected.

18. The method of claim 17 further comprising controlling a position of the light source.

19. The method of claim 17 further comprising controlling a brightness of the light source.

20. The method of claim 17 further comprising:
providing a processor and a program element, the program element executable on the processor; and
running the program element to execute the illuminating of the first and second surfaces.

21. The method of claim 20 further comprising:
providing a non-transitory computer-readable storage medium, wherein the program element is stored on the computer-readable storage medium.

22. A non-transitory computer-readable medium comprising:
a program element for executing a method comprising:
transmitting light from the light source toward a first surface of a body; and
transmitting light from the light source toward a second surface of the body,
wherein the light directed toward the second surface is diffused through the body and re-emitted through the first surface; and
wherein the light directed toward the first surface is externally reflected.

* * * * *

UNITED STATES PATENT AND TRADEMARK OFFICE
CERTIFICATE OF CORRECTION

| | | |
|---|---|---|
| PATENT NO. | : 8,322,880 B2 | Page 1 of 1 |
| APPLICATION NO. | : 12/522195 | |
| DATED | : December 4, 2012 | |
| INVENTOR(S) | : Carsten Vogel et al. | |

It is certified that error appears in the above-identified patent and that said Letters Patent is hereby corrected as shown below:

In the Specification

Column 7, line 31, "Si" should read -- S1 --.

Signed and Sealed this
Eighteenth Day of August, 2015

Michelle K. Lee
*Director of the United States Patent and Trademark Office*